Dec. 22, 1964                G. DEL GIZZO                3,162,190
                DIAGNOSTIC AND EXPLORATORY INSTRUMENT
                      Filed Oct. 31, 1962
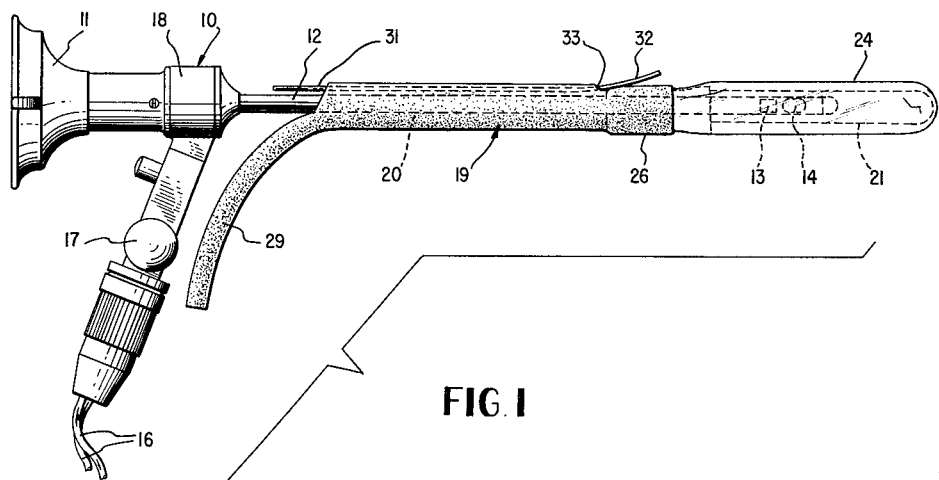
FIG. 1
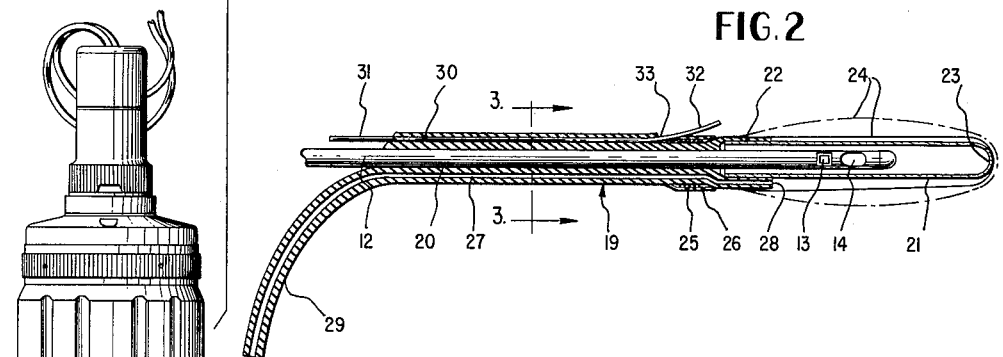
FIG. 2
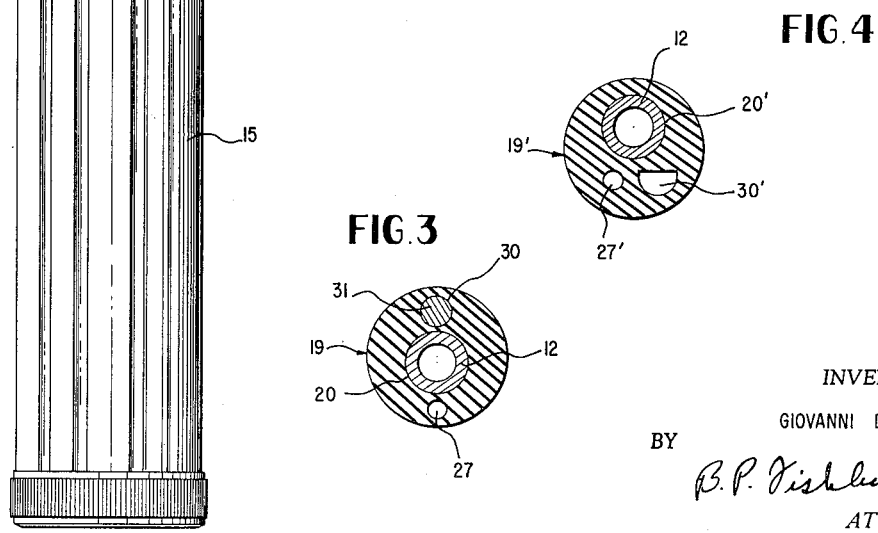
FIG. 4
FIG. 3
INVENTOR.
GIOVANNI DEL GIZZO
BY
*B. P. Fishburne, Jr.*
ATTORNEY

United States Patent Office 3,162,190
Patented Dec. 22, 1964

3,162,190
DIAGNOSTIC AND EXPLORATORY INSTRUMENT
Giovanni Del Gizzo, 27 E. 13th St., New York, N.Y.
Filed Oct. 31, 1962, Ser. No. 234,414
1 Claim. (Cl. 128—6)

This invention relates to diagnostic instruments for use by physicians.

More particularly, the invention is an instrument for enabling a physician to explore and visually observe internal organs of the body without the necessity for a full scale exploratory surgical operation, the instrument also enabling the visual examination of certain deep enlarged or restricted body cavities.

Heretofore, the medical profession has had available certain illuminated optical probes and like optical instruments for enabling visual examination of body cavities, where the viewer's eye is located externally of the body. Such instruments are not entirely satisfactory for several important reasons. To begin with, sterility of the instrument cannot be maintained, therefore rendering it dangerous to insert the instrument into the body through an open incision and this is generally not attempted. Secondly, when the instrument or probe is used in a narrow body cavity or directly adjacent an organ or tissue undergoing examination, there is insufficient clearance between the viewing window of the instrument and the adjacent tissue to secure good focusing and/or proper illumination of any appreciable area and a good "picture" cannot be obtained.

One of the principal objects of this invention is, therefore, to provide an exploratory diagnostic instrument which completely overcomes the above deficiencies of the prior art by the provision of an instrument component readily separate from the optical probe and which component may be maintained sterile thereby permitting direct visual examination of organs or tissue deep within the body through a very small opening or incision. Another feature of the instrument allows the surrounding tissue being observed to be pushed back a sufficient distance from the viewing window of the probe to enable clear illumination of a substantial area of tissue and good focusing and therefore a good clear view of the tissue.

Another important object of the invention, the accomplishment of which constitutes an important improvement over and departure from the prior art, is the provision of means on the instrument for removing tissue directly adjacent the area undergoing visual examination and during such examination and without the necessity of utilizing a separate bioptic instrument in a cumbersome or awkward manner and requiring a larger incision. The present instrument may be used by the physician with or without the tissue removing component thereof as the particular need dictates and the instrument may accommodate bioptic tools of different well-known type swith equal facility, rendering in every case the complete combination instrument highly compact and highly convenient to use with the very minimum traumatic effect on the patient.

Other important objects and advantages of the invention will be apparent during the course of the following description.

In the accompanying drawings forming a part of this application and in which like numerals are employed to designate like parts throughout the same, FIGURE 1 is a side elevation of the complete instrument and showing all components thereof in assembled relationship, in accordance with one preferred embodiment of the invention, parts broken away, FIGURE 2 is a fragmentary central vertical longitudinal section through the vital components of the assembled instrument, FIGURE 3 is an enlarged transverse vertical section taken on line 3—3 of FIGURE 2, and FIGURE 4 is a similar section showing a slight modification of the invention.

In the drawings, wherein for the purpose of illustration are shown preferred embodiments of the invention, attention is directed first to FIGURES 1 through 3, wherein the numeral 10 designates generally an optical probe of a well-known type including an eye piece 11 and a probe stem 12 provided near its tip with a viewing window 13 and an adjacent illuminating window 14. The power unit 15 of conventional construction containing batteries is connected through wires 16 with a suitable connector means 17 swiveled at 18 to the neck of the eye piece, and containing an off-and-on switch which is closed to illuminate the instrument when the detachable connector 17 is in place thereon. All of this construction being conventional need not be described in further detail.

The invention instrument further comprises an elastomer tube-like body portion 19 formed of molded latex or the like and having a preferably central through bore 20 for the reception of the probe stem 12 in snug fitting relation as shown in the drawings. A substantially rigid transparent tubular housing or bulb 21 formed of glass or plastics material is firmly secured to the leading end of the body portion 19 either by telescoping socketed engagement at 22 as depicted in FIGURE 2 or preferably by an end-to-end adhesive butt joint between the body portion 19 and the housing 21, not shown in the drawings. The latter construction is slightly more compact than the telescopic joint illustrated herein, although either arrangement is satisfactory. The cylindrical housing 21 has a closed blunt nose 23 and has its bore in direct communication with the relatively smaller through bore 20 so that the housing may directly receive the illuminated tip portion of the probe stem 12 in spaced relation as shown in the drawings. The body portion 19 is preferably soft and pliable whereas the housing 21 is preferably substantially rigid, as stated. The optical probe is readily removable from the body portion 19 when required and the entire body portion 19 may be sterilized in any convenient manner.

The instrument further comprises an extremely thin-walled substantially transparent air inflatable bladder or balloon 24 closely surrounding the housing 21 before inflation and adapted to be distended relative to the housing in varying degree as found necessary for particular uses of the instrument; one such distended condition of the bladder being shown in broken lines in FIGURE 2. The open neck end 25 of the inflatable bladder is suitably secured in an airtight manner as at 26 to the leading end portion of the body portion 19 and in surrounding relation thereto. Thus, an airtight chamber is formed between the bladder and the housing 21.

A relatively small longitudinal air channel 27 is formed through the body portion 19 near one side thereof and upon one side of the central bore 20 and this passage opens through the leading end of the body portion 19 and communicates directly at 28 with the space between the inflatable bladder and transparent housing 21. A flexible extension 29 is formed upon the rear end of body portion 19 and the air passage 27 is extended through and to the free end of this extension so that air from a syringe-type pump or the like may be forced into the bladder 24 to inflate the same to the necessary extent.

On the opposite side of the body portion 19, diametrically remote from the passage 27, another small passage 30 is formed through the body portion longitudinally for the reception of a conventional bioptic instrument 31, readily detachable from the body portion 19. The working end 32 of the bioptic instrument emerges from the body portion 19 at 33 near and inwardly of the neck of the bladder 24 and somewhat inwardly of the adjacent end of rigid housing 21. The bioptic instrument proper is shown in a largely diagrammatic manner with the tissue cutting elements thereof retracted. If need be, to prevent the bioptic instrument from interfering with the expanded bladder 24, the latter may have its side portion cemented locally to the body portion 19 near and in advance of the bioptic device. The passage 30 is adapted to accommodate various standard types of slender bioptic instruments. When the bioptic instrument is engaged snugly within the passage 30, it is stabilized with the remainder of the instrument structure and the entire instrument may be manipulated as a unitary device to view and examine tissue and to remove some tissue for bioptic analysis, if need be.

In FIGURE 4, there is shown a slight modification of the instrument, particularly concerned with the arrangement of the openings in the body portion 19'. Instead of the three openings being arranged side-by-side in a row diametrically of the body portion as in FIGURE 3, the larger through bore 20' which receives the stem 12 is arranged near one side of the body portion and the passages 27' and 30' for air and the bioptic tool respectively are arranged in spaced side-by-side relation near the inner side of the bore 20', making for a generally triangular spacing of the three openings or passages. Except for this difference, the construction of the instrument is identical to that of the preferred embodiment shown in FIGURES 1–3.

In use, a small opening may be formed by the surgeon in, say, the chest or abdominal wall and the assembled instrument, after sterilizing, may be placed within the body cavity and adjacent a portion of an organ or any tissue to be examined. Air is pumped through the extension 29 into the bladder 24 to inflate the same sufficiently to hold the tissue spaced an appreciable distance from the viewing window and illuminating window of the probe stem 12. The optical probe is illuminated and the physician will have a clear view of the illuminated tissue area and a proper focusing of the "picture" is obtainable because the tissue is not immediately overlying the windows 13 and 14 tending to block vision and illumination but is held back therefrom by the inflated bladder 24, thus providing through the transparent housing 21 and the transparent bladder a clear view as on a small screen.

Concurrently with this visual examination of tissue, the physician may snip off a biopsy specimen of tissue by means of the instrument 31 without disturbing the remainder of the instrument. In some examinations, the biopsy instrument need not be employed at all and may, in fact, be removed from the assembly which is then used for visual examination only.

The same instrument may be used in approximately the same manner inside of natural body cavities including the throat. Various degrees of inflation of the bladder 24 are provided depending upon particular areas of usage.

The housing 21 protects the optical probe and also the delicate bladder and forms itself a blunt probing portion to enter delicate regions without damage to the same.

As previously stated, the unit composed of the body portion 19, housing 21 and bladder 24 may be detached from the optical probe and biopsy tool for complete sterilization.

Through the use of this instrument, the physician or surgeon is enabled to perform visual examinations inside of the body with complete safety and which heretofore could only be performed by a major exploratory operation. The taking of tissue for bioptic analysis is also rendered safer and more efficient since the physician can view the general area close to where the tissue sample will be taken. These and other advantages of the instrument will be readily apparent to those skilled in the art without further description herein.

It is to be understood that the forms of the invention herewith shown and described are to be taken as preferred examples of the same, and that various changes in the shape, size and arrangement of parts may be resorted to, without departing from the spirit of the invention or scope of the subjoined claim.

Having thus described my invention, I claim:

A combination diagnostic, exploratory and bioptic instrument comprising a unitary all-elastomer body portion having a main longitudinal through bore adapted to receive snugly and removably the stem of an illuminated optical examining probe and with the examining window of said probe projecting forwardly of said body portion, a substantially rigid transparent tubular housing secured to the forward end of said body portion and having a closed forward end and extending for a substantial distance forwardly of the body portion and adapted to surround and enclose the probe stem adjacent the window thereof in spaced substantially concentric relation thereto, a thin walled substantially transparent elastic inflatable bladder attached to the forward end of the body portion and surrounding and enclosing said transparent tubular housing and adapted to be inflated for forcing surrounding body tissue outwardly from the transparent housing, said body portion having a secondary longitudinal bore separate from and generally parallel to said main bore with the forward end of the secondary bore communicating directly with the interior of the bladder at the forward end of the body portion, a flexible lateral extension on the rear end of the body portion having a bore communicating with said secondary bore and through which air may be forced to temporarily inflate said bladder, and said body portion having a third longitudinal bore extending therethrough in spaced substantially parallel relation to the main and secondary bores and adapted to receive removably an elongated bioptic instrument, the forward end of the third bore terminating near and rearwardly of said housing and bladder and opening through the side wall of said body portion to facilitate removal of a tissue sample exteriorly of and adjacent the inflated bladder.

References Cited in the file of this patent

UNITED STATES PATENTS

| | | |
|---|---|---|
| 1,150,214 | London | Aug. 17, 1915 |
| 1,397,732 | Goodloe | Nov. 22, 1921 |
| 1,727,495 | Wappler | Sept. 10, 1929 |
| 2,850,007 | Lingley | Sept. 2, 1958 |
| 3,057,345 | Ferris et al. | Oct. 9, 1962 |
| 3,100,482 | Hett | Aug. 13, 1963 |

FOREIGN PATENTS

| | | |
|---|---|---|
| 502,331 | Great Britain | Mar. 15, 1939 |
| 455,836 | Canada | Apr. 12, 1949 |
| 462,810 | Canada | Jan. 31, 1950 |